United States Patent Office 3,252,906
Patented May 24, 1966

3,252,906
GREASE
Helen M. Sellei Beretvas, Chicago, Ill., assignor to Standard Oil Company, Chicago, Ill., a corporation of Indiana
No Drawing. Filed June 7, 1963, Ser. No. 286,163
5 Claims. (Cl. 252—18)

This invention relates to lubricant greases, and more particularly applies to greases useful in applications at temperatures in the range of about 400 to about 600° F.

Modern high speed machinery and propulsion engines impose severe requirements on lubricants used in connection with these devices. The lubrication problem is especially severe with greases, inasmuch as both the liquid vehicle and the solid thickening agent components of the grease must be capable of performing under the medium to high temperatures prevailing in bearings, gears, and other frictionally engaged surfaces.

In the past, greases have tended to be of two types. The most common type is a hydrocarbon mineral oil thickened with metallic soaps. Unfortunately, these are limited to rather low temperatures, by reason of the inherent instability of hydrocarbons at elevated temperatures, and the relatively low melting points of most soaps. The other broad type is composed of special organic fluids such as the silicones (organic-substituted polysiloxanes) or the esters, thickened with the certain high melting organic compounds. While this latter class of greases is generally satisfactory for high temperature applications—at or above around 600° F.—the greases are quite expensive.

An object of the invention is to provide a lubricant grease which is suitable for applications at temperatures above those for which soap-thickened hydrocarbons are usable but which, although not suitable for temperatures exceeding about 600° F., is nonetheless quite satisfactory at medium temperatures and is substantially lower in cost than the special high temperature greases.

Briefly and in accordance with the invention, I provide a grease for medium temperature applications comprising a silicone fluid vehicle thickened to grease consistency with a complex of calcium benzoate and calcium hydroxide, the calcium hydroxide constituting up to about 30 percent by weight of the complex. There is no ready explanation of why or how calcium benzoate and calcium hydroxide serve as a grease thickener, in view of the relatively low melting point (144–156° C.) of calcium benzoate alone. Nonetheless, the complex-thickened silicones of the invention are simple to make, low in cost, and very satisfactory for use in medium temperature applications.

The greases of the invention have, as their essential ingredients, a silicone fluid and a complex of calcium benzoate and calcium hydroxide. The silicone fluid may be any of the polysiloxanes, advantageously substituted with either methyl or phenyl groups, or a mixture of such groups. Silicone fluids are commonly available in various grades from Dow Corning Corporation and from General Electric Company.

The "complex" of calcium benzoate and calcium hydroxide advantageously constitutes from about 20 to about 60 percent by weight of the grease. This thickener proportion may be varied depending upon the initial fluid viscosity and the final grease penetration.

The greases of the invention are advantageously made by commingling the silicone fluid vehicle with calcium benzoate and with calcium hydroxide, and heating the mixture to a temperature sufficient to form the calcium benzoate-calcium hydroxide complex. This mixture is then cooled and milled to form the final grease. If desired, various additives may be incorporated into the grease at any stage of its manufacture.

It is preferred to employ a wetting agent of the group water or water-soluble lower alkanols during grease manufacture. This markedly improves the hardness of the grease, apparently by promoting the dispersion of complex and silicon fluid. Wetting agents such as water or isopropanol exhibit excellent characteristics with regard to improving grease texture, and in some cases it is even possible to reduce or even obviate much of the milling.

The invention will be more sufficiently described in the following examples, which are to be considered as illustrating specific embodiments of the invention but not as being wholly exclusive with respect to scope or conditions.

EXAMPLE I

In this example a series of greases is prepared to illustrate the effect of calcium hydroxide and calcium benzoate, separately and in combination, as thickeners for a silicone fluid.

The silicon fluid is Dow Corning QF–6–7024, having a viscosity at 77° F. of 600 centistokes, and at 210° F. of 20 cst. It has a zero acid number; a 610 degree flash point; a fire point greater than 700° F.; a —5° C. freezing point; a specific gravity at 25° C. of 1.115; and a refractive index at 25° C. of 1.566. It is presumably a methyl phenyl silicone, with a high proportion of phenyl to methyl groups.

To produce the grease, 6.5 grams of silicone fluid, 4.0 grams calcium benzoate (Heyden Newport), and indicated amounts of calcium hydroxide are mixed cold in a glass beaker, rapidly heated to 520° F., and cooled and milled. In runs 2, 4, and 5, a wetting agent is employed. In runs 2 and 5, the grease is reheated after cooling to boil off the alcohol and further heated to 520° F. before cooling and milling.

Both before and after milling, grease consistency is determined by visual inspection and feel. Greases are each then reheated for six hours at 420° F., and the "heating then milling" inspections thereupon made.

The following results are observed:

*Alkaline calcium benzoate thickened grease*

| | Thickener (Complex) | | Wetting Agent | | Consistency | | |
|---|---|---|---|---|---|---|---|
| Run No. | Calcium Benzoate, Weight Percent | Calcium Hydroxide, Weight Percent | Water, Weight Percent | Isopropanol, Weight Percent | Unmilled | After Milling | Heating Then Milling |
| 1 | 38 | | | | Grainy, viscous liquid | Very soft grease. Almost semifluid. | Semifluid. |
| 2 | 38 | | | 50 | Soft grease | do | Do. |
| 3 | 36.4 | 4.5 | | | Semi-soft grease | Very soft grease | Soft grease. |
| 4 | 36.4 | 4.5 | 28 | | Firm grease | Soft grease. Considerably harder than in Runs 1–3. | Do. |
| 5 | 36.4 | 4.5 | | 50 | Viscous liquid | do | Do. |

It is particularly noted that a calcium benzoate thickened grease, where no excess calcium hydroxide is present, does not give a usable grease, even when an isopropanol wetting agent is employed.

EXAMPLE II

In this example, an alkaline benzoate grease is prepared in situ by reacting 19.5 grams benzoic acid with 9.5 grams calcium hydroxide in QF-6-7024 silicone fluid. The mixture is heat treated for 32 hours at 440° F., 1.5 hours at 650° F., and then 16 additional hours at 440° F. The final grease has a thickener content of 23 percent and a penetration of 321.

In a bearing test run at 600° F., the grease provided satisfactory lubrication for 56¾ hours before failure.

Thus it is apparent that greases pursuant to the invention are quite effective for moderate temperature applications, and thus constitute low cost materials that are suitable for many applications in which soap-thickened hydrocarbons are unsatisfactory. The effect of calcium hydroxide on calcium benzoate to form a complex suitable as a grease thickener is rather unusual; substitution of sodium hydroxide for the calcium hydroxide converts the "grease" to a hard white mass in a high temperature bearing test in about ten to fifteen hours that possesses none of the characteristics of a grease. Further, the use of calcium benzoate as a thickener runs contrary to suggestions in the art, which has used calcium benzoate as an additive in various lubricants (see for example U.S. 2,182,137, 2,576,031, 2,576,032, 2,576,033, and 2,768,138) without, however, attributing thickener properties to the benzoates.

While the invention has been described in conjunction with specific aspects thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

I claim:

1. A lubricant grease comprising a polysiloxane fluid vehicle thickened to grease consistency with from about 20 to about 60 percent by weight a complex of calcium benzoate and calcium hydroxide, said calcium hydroxide comprising from 4.5 to about 30 percent by weight of the complex.

2. A method of preparing a lubricant grease comprising: commingling a polysiloxane fluid vehicle with from 20 to about 60 percent by weight of a complex of calcium benzoate and calcium hydroxide, said calcium hydroxide comprising from 4.5 to about 30 percent by weight of the calcium benzoate plus calcium hydroxide, heating the mixture to a temperature sufficient to form the resulting calcium benzoate-calcium hydroxide complex, and cooling and milling the resulting grease.

3. The method of claim 2 wherein said heating is effected in the presence of a volatile wetting agent selected from the group consisting of water and lower alkanols.

4. The method of claim 3 wherein said wetting agent is water.

5. The method of claim 3 wherein said wetting agent is isopropanol.

References Cited by the Examiner
UNITED STATES PATENTS

| | | | |
|---|---|---|---|
| 1,844,754 | 2/1932 | Geller | 44—7 |
| 2,576,031 | 11/1951 | Morway et al. | 252—41 X |
| 2,719,826 | 10/1955 | Hotten | 252—18 |
| 2,768,138 | 10/1956 | Hotten et al. | 252—37.7 |

DANIEL E. WYMAN, *Primary Examiner.*